United States Patent [19]

Sugano et al.

[11] Patent Number: 5,724,087
[45] Date of Patent: Mar. 3, 1998

[54] IMAGE FORMING APPARATUS AND METHOD FOR CORRECTING A SCANNING LINE BEND

[75] Inventors: Takao Sugano; Masayuki Iwasa; Kazuki Ogawa, all of Kawasaki, Japan

[73] Assignee: Fujitsu Limited, Kawasaki, Japan

[21] Appl. No.: 495,173

[22] Filed: Jun. 27, 1995

[30] Foreign Application Priority Data

Oct. 25, 1994 [JP] Japan .................. 6-260014

[51] Int. Cl.⁶ ............................................. B41J 2/47
[52] U.S. Cl. ............................... 347/243; 347/241
[58] Field of Search ........................... 347/243, 241, 347/244, 256, 258, 259, 260, 261

[56] References Cited

U.S. PATENT DOCUMENTS

| | | | |
|---|---|---|---|
| 4,561,717 | 12/1985 | Kataoka et al. | 350/6.8 |
| 4,878,066 | 10/1989 | Shiraishi | 346/108 |
| 5,218,413 | 6/1993 | Kanai | 355/326 |
| 5,512,949 | 4/1996 | Fisli et al. | 347/243 |
| 5,517,328 | 5/1996 | Wilson | 347/241 |

FOREIGN PATENT DOCUMENTS

| | | |
|---|---|---|
| 0 291 035 | 11/1988 | European Pat. Off. . |
| 0 388 981 | 9/1990 | European Pat. Off. . |
| 0 412 036 A | 2/1991 | European Pat. Off. . |
| 61-261715 | 11/1986 | Japan . |

Primary Examiner—Mark J. Reinhart
Attorney, Agent, or Firm—Armstrong, Westerman, Hattori, McLeland & Naughton

[57] ABSTRACT

An exposure method which has a step of offsetting a first scanning line bend by scanning means with a second scanning line bend by an image forming lens, and/or a step of correcting angles of optical axis of a plurality of light beams in accordance with the amount of a deviation in a subscanning direction due to a difference of the angles of incidence, so that a distance between scanning lines on a photosensitive body due to the plurality of light beams is corrected.

An image forming apparatus which has an image forming lens for producing a second scanning line bend is so as to offset a first scanning line bend by scanning means, and/or correcting means for correcting angles of optical axis of a plurality of light beams in accordance with the amount of a deviation in a subscanning direction due to a difference of the angles of incidence, so that a distance between scanning lines on a photosensitive body due to the plurality of light beams is corrected.

11 Claims, 13 Drawing Sheets

5,724,087

1

IMAGE FORMING APPARATUS AND METHOD FOR CORRECTING A SCANNING LINE BEND

BACKGROUND OF THE INVENTION

1. Field of the Invention

The invention relates to an exposure method for an image forming apparatus, and also to an image forming apparatus. For example, the invention can be used in an electrophotographic image forming apparatus such as a laser printer or a digital copier.

2. Description of Related Art

Recently, as an electron apparatus has a higher performance, a laser printer is requested to increase its printing speed and have a higher resolution, and print an image of a higher quality. As a technique of increasing the printing speed, known is a method in which the rotational speed of a polygon scanner is increased. However, the method in which the rotational speed of a polygon scanner is increased involves a large increase of the cost. Furthermore, the upper limit of the rotational speed is restricted from a physical standpoint. In place of the method, therefore, it is proposed to employ a method in which a plurality of light sources are used (multibeam scanning method).

In the multibeam scanning method, one scanning operation causes a plurality of scanning beams to reach a photosensitive body so that electrostatic latent images due to the plural scanning lines are simultaneously formed. In the future, the speed of a laser beam printer is expected to be further increased by implementation of the multibeam scanning method.

Conventionally, a laser beam printer according to the multibeam scanning method is disclosed by Japanese Patent Application Laid-Open No. 61-261715(1986).

FIG. 1 is a diagram schematically showing the configuration of the conventional laser beam printer 80. In FIG. 1, the laser beam printer 80 comprises two semiconductor laser devices 81 and 82, cylinder lenses 83a and 83b, a polygon mirror 85, image forming lenses 86 and 87, a photosensitive drum 88, and a sensor 89.

Two light beams BM11 and BM12 emitted from the semiconductor laser devices 81 and 82 impinge on the polygon mirror 85 which is rotated at a constant speed. Then, the two light beams BM11 and BM12 are parallel to each other in a plane parallel to the rotation axis of the polygon mirror 85, and also beams reflected from the polygon mirror 85 are parallel to each other (see FIG. 3). The angles of incidence of the two light beams BM11 and BM12 projected onto a plane perpendicular to the rotation axis of the polygon mirror 85 are different from each other, or have values of $\theta 11$ and $\theta 12$, respectively.

In the conventional laser beam printer 80, the difference between the angles of incidence $\theta 11$ and $\theta 12$ of the two light beams BM11 and BM12 causes the pitch of the scanning beams passing through the surface of the photosensitive drum 88 to be disturbed, thereby lowering the quality of the resulting image.

Specifically, the angle of incidence $\theta 11$ of the light beam BM11 emitted from the one semiconductor laser device 81 is greater than the angle of incidence $\theta 12$ of the light beam BM12 emitted from the other semiconductor laser device 82. Consequently, a beam spot BS11 due to the light beam BM11 precedes a beam spot BS12 due to the light beam BM12 on the photosensitive drum 88.

2

FIG. 2 is a diagram showing positions of the light spots BS11 and BS12 which are formed on the photosensitive drum 88 at a certain instant.

As shown in FIG. 2, at an instant, the beam spots BS11 and BS12 due to the two light beams BM11 and BM12 appear on the photosensitive drum 88. The beam spots BS11 and BS12 are separated from each other in the main scanning direction M1 by a distance Ld which is caused by the difference between the angles of incidence $\theta 11$ and $\theta 12$, and in the subscanning direction M2 by a predetermined pitch LPt which corresponds to the resolution of the image to be formed. Therefore, at the instant when the succeeding beam spot BS12 reaches the position EE in the main scanning direction where the preceding beam spot BS11 was positioned and a pixel BS12x is printed at the position EE, a pixel BS11x printed by the preceding beam spot BS11 has been moved in the subscanning direction by a predetermined distance $\Delta L$ by the rotation of the photosensitive drum 88. Such a phenomenon occurs in all the beam spots BS11 and BS12 due to the two light beams BM11 and BM12. Therefore, the pitch LPa of the scanning lines SL11 and SL12 which are actually drawn on the photosensitive drum 88 as a result of the movement of the two beam spots BS11 and BS12 is greater than the pitch LPt in the subscanning direction of the two beam spots BS11 and BS12.

When, as in the case of the prior art, the pitch LPt of the two beam spots BS11 and BS12 in the subscanning direction is equal to the theoretical pitch which is originally to be formed on the photosensitive drum 88, the pitch LPa of the scanning lines SL11 and SL12 which are actually drawn on the photosensitive drum 88 is not always accurate, thereby lowering the quality of the resulting image.

As shown in FIG. 3, the two light beams BM11 and BM12 emitted from the semiconductor laser devices 81 and 82 are parallel to each other in the plane parallel to the rotation axis of the polygon mirror 85, and also the beams reflected from a reflecting surface 85R of the polygon mirror 85 are parallel to each other. Therefore, it is impossible to cause both the light beams BM11 and BM12 to pass through the optical centers of the image forming lenses 86 and 87. Consequently, the light beams BM11 and BM12 pass through a position other than the optical centers of the image forming lenses 86 and 87, resulting in that the scanning lines of the light beams are bent. Such a bend of a scanning line is sometimes called "bow". Scanning line bends are formed in such a manner that the bend directions of the scanning lines above the optical centers of the image forming lenses 86 and 87 are opposite to those of the scanning lines below the optical centers. Therefore, the distance between the two scanning lines SL11 and SL12 due to the two light beams BM11 and BM12 varies depending on the positions of the main scanning lines, thereby lowering the quality of the resulting image.

SUMMARY OF THE INVENTION

The invention has been conducted in order to solve the above-discussed problems. It is the principal object of the invention to provide an exposure method for an image forming apparatus, and an image forming apparatus which employ the multibeam scanning method using a plurality of light sources and in which scanning lines formed on a photosensitive body are prevented as much as possible from being disturbed so that the image quality is prevented from being lowered while attaining an improved printing speed.

According to the exposure method and the image forming apparatus of the invention, a first scanning line bend produced by scanning means for reflecting and scanning a light beam by means of a reflecting surface which is rotatively moved is canceled by a second scanning line bend due to an image forming lens. Since the reflecting surface is flat, the angle of incidence varies in accordance with the rotation of the scanning means. Namely, the angle of incidence at an end portion of the reflecting surface is greater than that at the center of the reflecting surface. Therefore, the light beam which impinges on an end portion of the reflecting surface and is to impinge on an end of the photosensitive body passes through a position separated from the optical center of the image forming lens. As a result, the first scanning line bend is produced. When a light beam passes through a position distant from the optical center of the image forming lens, the light beam is refracted also in a direction perpendicular to the scanning direction. As the position is closer to either of the both ends with starting from the center of the scanning direction of the image forming lanes, the degree of refraction has a larger value. As the degree of the refraction is greater or the position is closer to one of the both ends, the light beam approaches nearer the optical center, with the result that a second scanning line bend is produced. When the path of a light beam is set so that the first and second scanning line bends are opposite in direction to each other and substantially equal in degree to each other, the bends cancel each other so that a scanning line which is free from a scanning line bend is formed on the photosensitive body.

According to the exposure method and the image forming apparatus of the invention, the optic-axial angle of the light beam with respect to the scanning means is corrected so that the distance between scanning lines on the photosensitive body due to a plurality of light beams is corrected by a positional deviation amount in the subscanning direction due to the difference of the angles of incidence. In the case where light beams emitted from the plural light sources impinge on the scanning means at different angles of incidence, the difference of the angles of incidence causes a time delay in the main scanning direction to be produced between beam spots on the photosensitive body. The time delay produces deviation in the pitch of the scanning lines on the photosensitive body. When the angles of incidence are previously adjusted by a degree corresponding to that of the deviation, the pitch on the photosensitive body is accurately formed so that the image quality is improved.

When these methods or apparatuses are combined with each other, further effects are attained.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings showing its embodiments.

Figure 1:
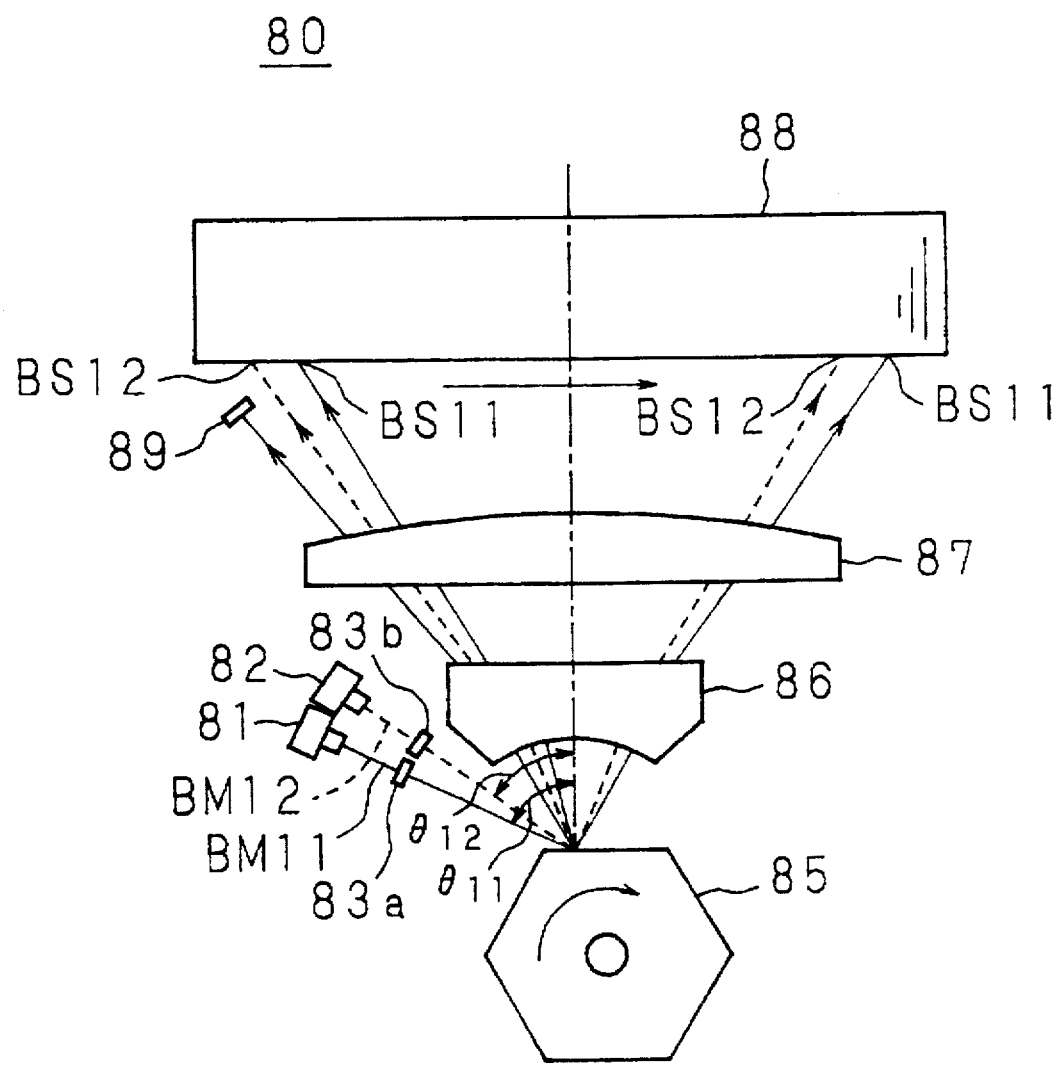
FIG. 1 is a diagram schematically showing the configuration of a conventional laser beam printer.
Figure 2:
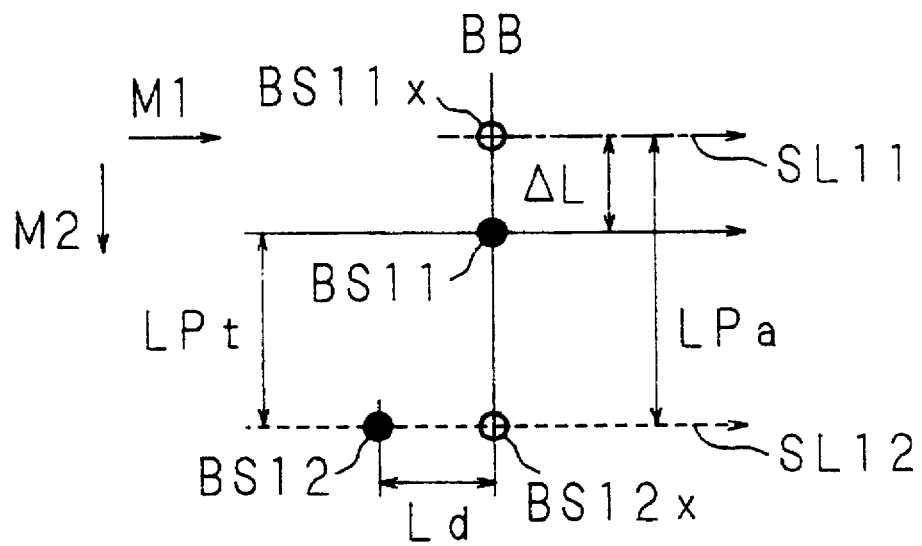
FIG. 2 is a diagram showing positions of beam spots on a photosensitive drum at instants.
Figure 3:
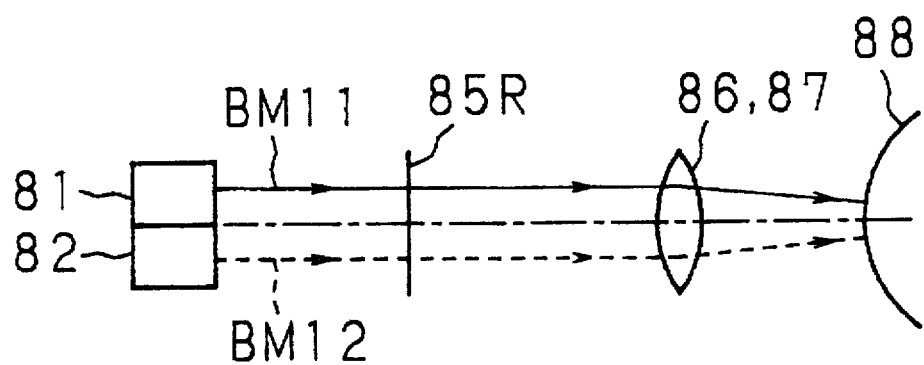
FIG. 3 is a development diagram showing a state in which light beams are projected onto a plane parallel to the rotation axis of a polygon mirror.
Figure 4:
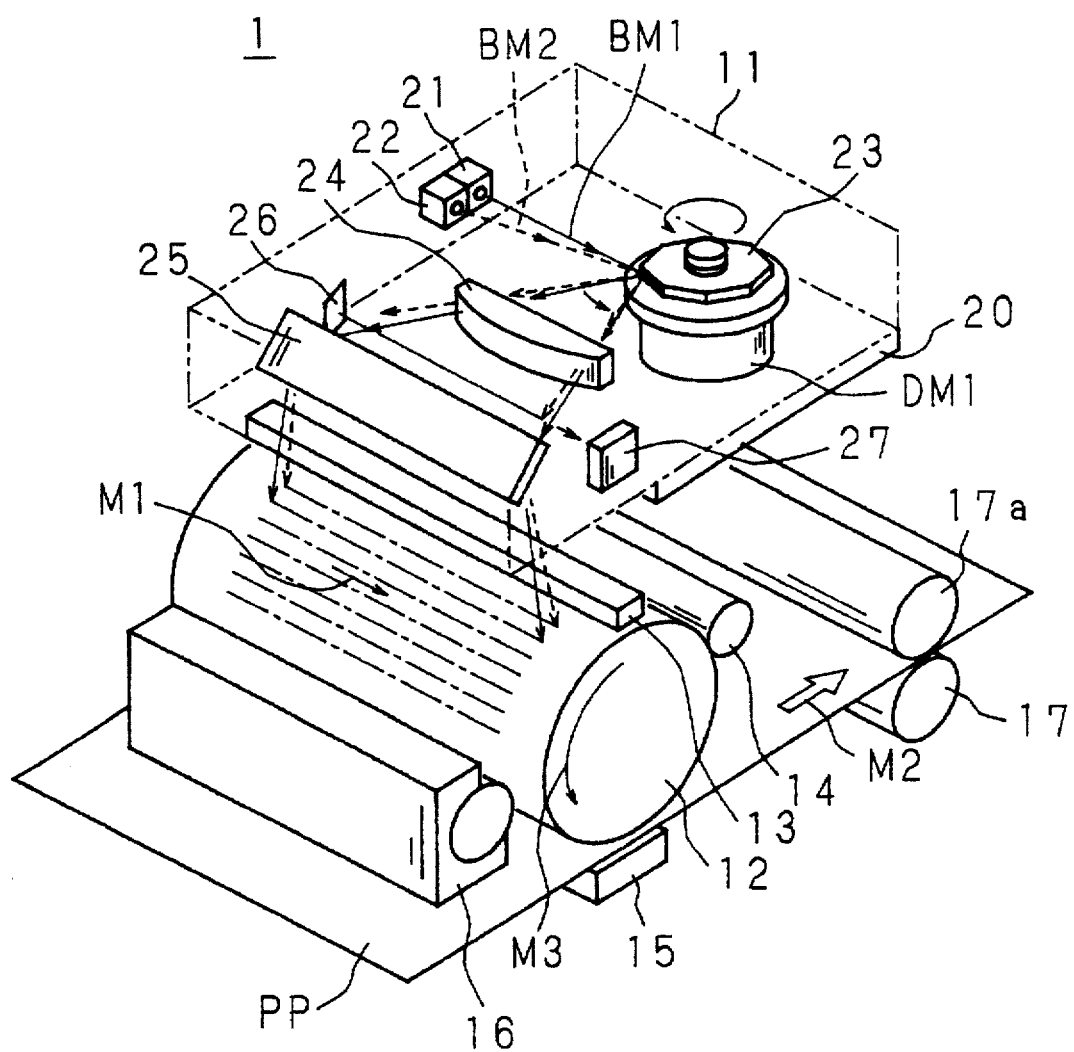
FIG. 4 is a perspective view schematically showing the configuration of a laser beam printer according to the invention.
Figure 5:
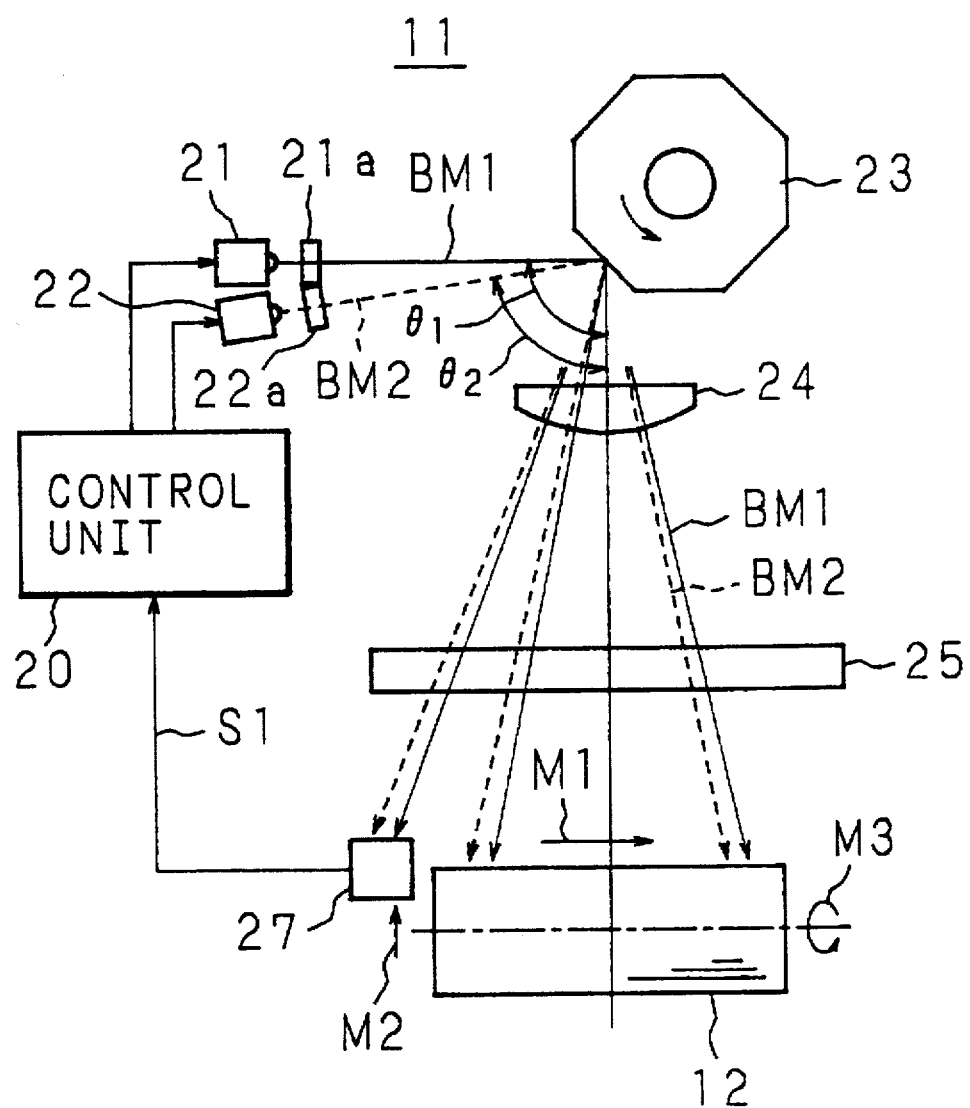
FIG. 5 is a diagram illustrating the operation of an optical unit.
Figure 7:
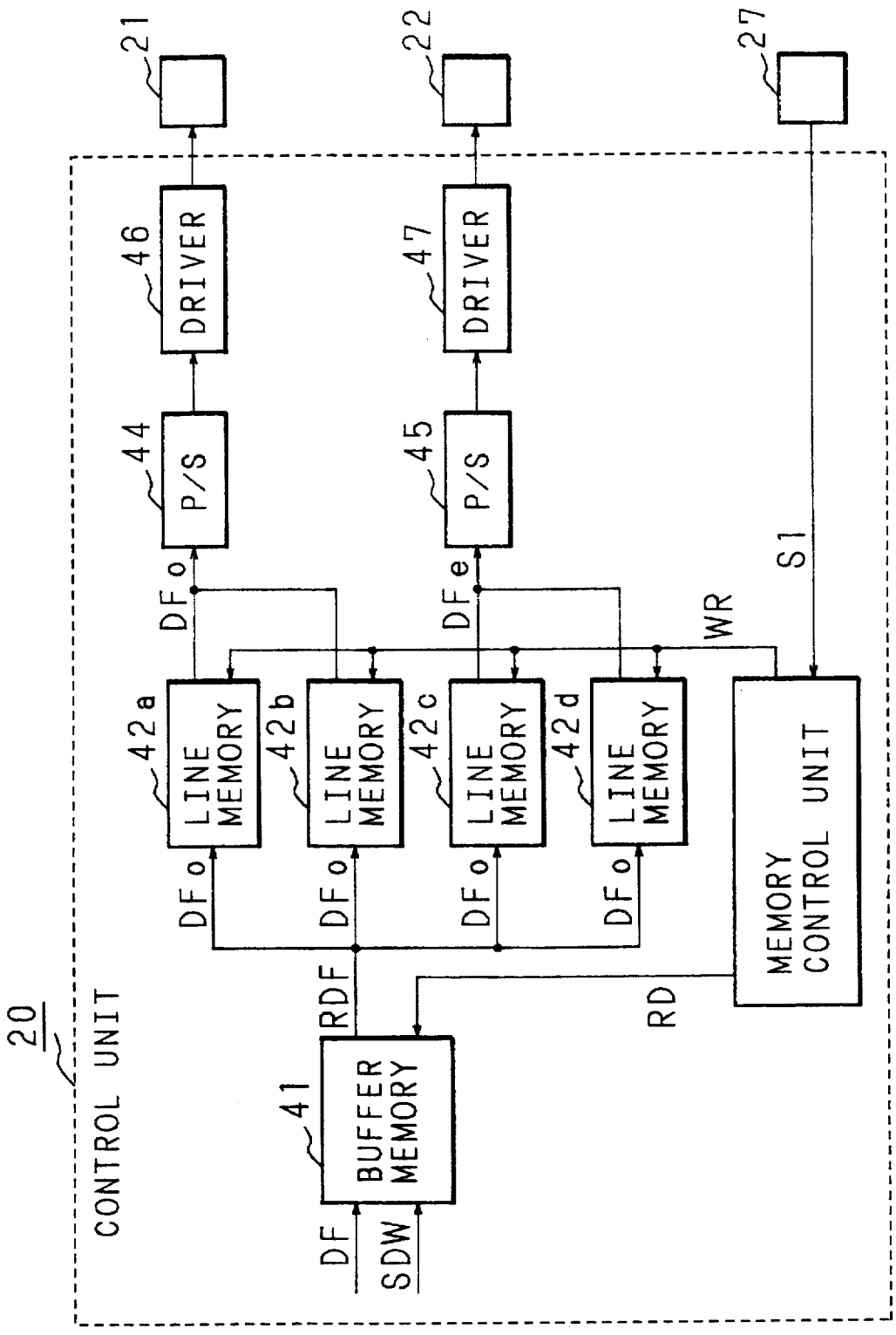
FIG. 7 is a block diagram showing a partial circuit of a control unit.
Figure 8:
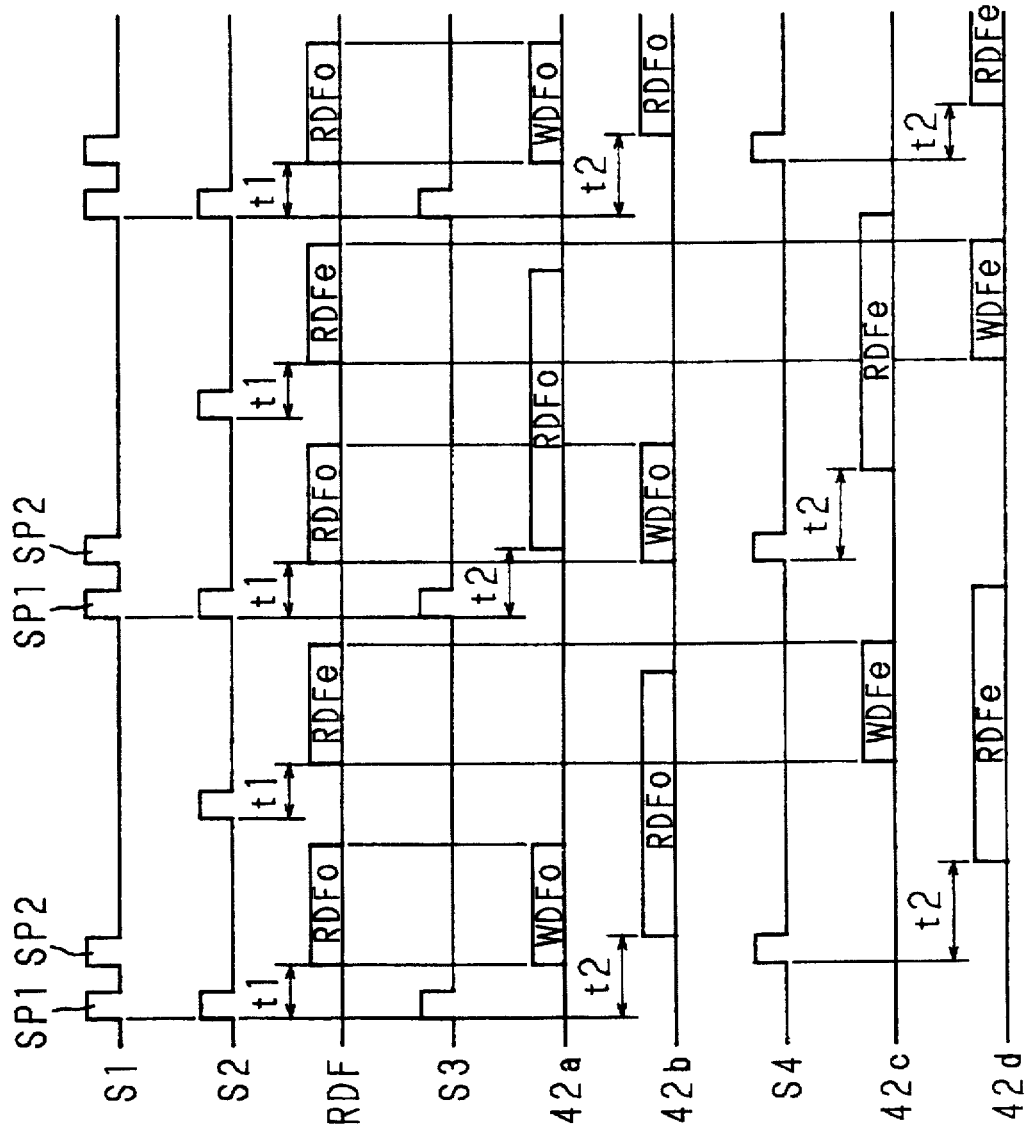
FIG. 8 is a timing chart showing an operation state of the partial circuit of the control unit.

FIG. 4 is a perspective view schematically showing the configuration of a laser beam printer 1 according to the invention. FIG. 5 is a diagram illustrating the operation of an optical unit 11, FIG. 7 is a block diagram showing a partial circuit of a control unit 20, and FIG. 8 is a timing chart showing an operation state of the partial circuit of the control unit 20.

In FIGS. 4 and 5, the laser beam printer 1 comprises the optical unit 11, a photosensitive drum 12, a charger 13, a developer 16, a transfer device 15, a cleaner 14, a fixing device 17, and the control unit 20.

The optical unit 11 deflects two light beams BM1 and BM2 which have undergone the luminance modulation, and draws two scanning lines SL1 and SL2 by one scanning operation in the main scanning direction (direction of arrow M1) of the surface of the photosensitive drum 12, whereby images of 2 lines are simultaneously formed.

The optical unit 11 comprises two semiconductor laser units 21 and 22, a polygon mirror 23, an fθ-lens 24, a reflecting mirror 25, a small mirror 26, and a sensor 27.

Each of the semiconductor laser units 21 and 22 comprises a semiconductor laser diode, a collimator lens, and a cylinder lens. The semiconductor laser units 21 and 22 further comprise adjusting devices 21a and 22a for adjusting the optical axes, respectively. The semiconductor laser units 21 and 22 emit the light beams BM1 and BM2 which have undergone the luminance modulation, on the basis of a signal from the control unit 20.

The polygon mirror 23 is rotated at a constant speed by a motor DM1, and deflects the light beams BM1 and BM2 emitted from the semiconductor laser units 21 and 22 so as to scan photosensitive drum in the main scanning direction.

The fθ-lens 24 converts the light beams BM1 and BM2 deflected so as to have a constant angular velocity by the polygon mirror 23, so as to attain a constant linear velocity.

The reflecting mirror 25 reflects the light beams BM1 and BM2 to guide them to the surface of the photosensitive drum 12. The small mirror 28 reflects the light beams BM1 and BM2 at the start position of each scanning operation, to guide them to the sensor 27. When the light beams BM1 and BM2 enter the sensor 27, the sensor 27 conducts the photoelectric conversion on them and outputs a signal S1 for attaining synchronization of the scanning operations.

The photosensitive drum 12 is rotated at a constant velocity in the direction of arrow M3 so that the surface of the upper side of the drum moves at a constant velocity in the direction opposite to the subscanning direction (direction of arrow M2). On the surface of the photosensitive drum 12, electrostatic latent images are formed by the scanning light beams BM1 and BM2 from the optical unit 11.

The charger 13 is used for previously charging the surface of the photosensitive drum 12 so as to have a constant potential. The developer 16 is used for adhering toner to the electrostatic latent images formed on the surface of the photosensitive drum 12, thereby developing the images. The transfer device 15 causes the toner images formed on the surface of the photosensitive drum 12 to be transferred to a paper PP. The cleaner 14 removes toner remaining on the surface of the photosensitive drum 12, thereby cleaning the surface.

The control unit 20 receives the signal S1 from the sensor 27 and drives the semiconductor laser units 21 and 22 in synchronization with the signal S1. The control unit 20 controls also the motor DM1 for the polygon mirror 23, a motor for rotating the photosensitive drum 12, and other devices.

Figure 6:
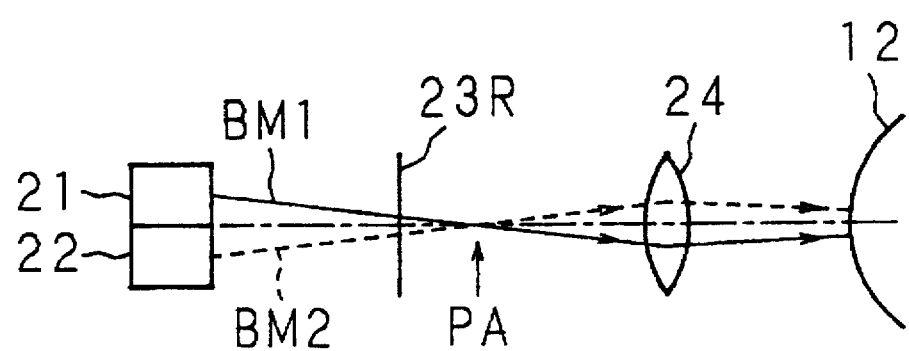
FIG. 6 is a development diagram showing a state in which light beams are projected onto a plane parallel to the rotation axis of a polygon mirror.

In FIG. 5, the two light beams BM1 and BM2 emitted from the semiconductor laser units 21 and 22 impinge on the polygon mirror 23 which is rotated at a constant velocity. In a plane parallel to the rotation axis of the polygon mirror 23, as shown in FIG. 6, the two light beams BM1 and BM2 obliquely impinge on the polygon mirror 23. The two light beams BM1 and BM2 are reflected from the polygon mirror 23 and then cross a plane including the optical center of the fθ-lens 24. The two light beams BM1 and BM2 pass through positions other than the optical center of the fθ-lens 24 and reach the surface of the photosensitive drum 12. The angles of incidence of two light beams BM1 and BM2 projected onto a plane perpendicular to the rotation axis of the polygon mirror 23 are different from each other, or have values of θ1 and θ2, respectively.

The angle of incidence θ1 of the light beam BM1 from one semiconductor laser unit 21 is greater than the angle of incidence θ2 of the light beam BM2 from the other semiconductor laser unit 22. On the photosensitive drum 12, therefore, a beam spot BS1 due to the light beam BM1 precedes a beam spot BS2 due to the light beams BM2 so that the beam spots BS1 and BS2 impinge on the sensor 27 in this sequence. As a result, the sensor 27 consecutively outputs two pulses in response to one scanning operation.

In FIG. 7, the control unit 20 comprises a buffer memory 41, four line memories 42a to 42d, a memory control unit 43, parallel/serial converters 44 and 45, and drivers 46 and 47.

The buffer memory 41 stores image data DF transmitted from the outside. The writing operation of the buffer memory 41 is conducted in response to a write signal SDW.

Each of the line memories 42 stores image data DF for one line which are read out from the buffer memory 41 line by line.

The memory control unit 43 controls the operation of reading data from the buffer memory 41 in accordance with a read signal RD, and also the operation of writing data into the line memories 42 in accordance with a write signal WR.

The parallel/serial converters 44 and 45 converts parallel image data DF read out from the line memories 42 line by line, into serial data.

In accordance with serial data from the parallel/serial converters 44 and 45, the drivers 46 and 47 control the on/off operation of the semiconductor laser units 21 and 22 so that the light beams BM1 and BM2 which have undergone the luminance modulation are emitted.

Among the four line memories 42a to 42d, the two line memories 42a and 42b store image data DFo for odd-numbered lines, and the remaining two line memories 42c and 42d store image data DFe for even-numbered lines. In each of the sets of the line memories 42a and 42b, and 42c and 42d, image data DFo and DFe are alternately written into and read out from the two line memories 42a and 42b, or 42c and 42d.

As shown in FIG. 8, in the signal S1 outputted from the sensor 27, two pulses SP1 and SP2 appear consecutively. The memory control unit 43 generates a signal S2 having a pulse frequency which is twice that of the preceding pulse SP1, or in which a pulse appears also at a position corresponding to one half of the period of the pulse SP1. The pulses SP1 and SP2 are independently taken out from the signal S1 so that signals S3 and S4 are generated on the basis of the pulses.

The image data DF are sequentially read out from the buffer memory 41 line by line and with a time delay t1 from each pulse of the signal S2. The reading operation is completed before the next pulse appears. In other words, in synchronization with the signal S2, odd-numbered and even-numbered lines are alternately read out in the sequence of image data DFo for an odd-numbered line, image data DFe for an even-numbered line, image data DFo for the next odd-numbered line, and so on.

The read out image data DFo for odd-numbered lines are alternately written into the line memories 42a and 42b, and the read out image data DFe for even-numbered lines are alternately written into the line memories 42c and 42d. The image data DFo and DFe written into the line memories 42a to 42d are read out with a time delay t2 from the next pulse in the corresponding signal S3 or S4. From each of the line memories 42a to 42d, therefore, the image data DFo or DFe for the lines are read out with a delay of one period after the generation of the pulses SP1 and SP2 of the signal S1.

The time t2 is determined in accordance with the positional relationship between the photosensitive drum 12 and the sensor 27 and the scanning speed so that electrostatic latent images formed on the photosensitive drum 12 are located at adequate positions in the main scanning direction.

Next, the optical axes of the two light beams BM1 and BM2 emitted from the semiconductor laser units 21 and 22 will be described.

Figure 9:
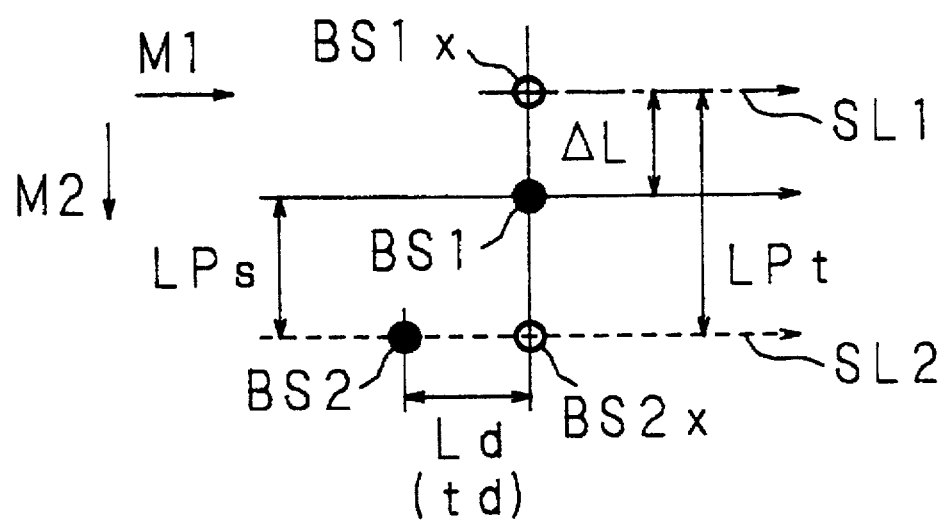
FIG. 9 is a diagram illustrating the pitch of scanning lines on a photosensitive drum.

FIG. 9 is a diagram illustrating the pitch LPt of the scanning lines SL1 and SL2 on the photosensitive drum 12.

The optical axes of the semiconductor laser units 21 and 22 are adjusted by the adjusting devices 21a and 22a so that the beam spots BS1 and BS2 on the photosensitive drum 12 are away from each other by a distance LPs in the subscanning direction. The distance LPs has a value satisfying the following expression (1):

$$LPs = LPt - \Delta L \tag{1}$$

where LPt indicates the theoretical pitch of the scanning lines SL1 and SL2, and ΔL indicates a moving distance caused by the rotation of the photosensitive drum 12.

The theoretical pitch LPt of the scanning lines SL1 and SL2 can be obtained from the image resolution. When the resolution is 600 dpi, for example, the theoretical pitch LPt is 42.3 μm. The distance ΔL can be obtained from the distance Ld between the two beam spots BS1 and BS2 in the main scanning direction, the scanning speed Vh in the main scanning direction, and the scanning speed Vv in the sub-scanning direction, or from the following expression (2):

$$\Delta L = (Ld/Vh) \times Vv \quad (2)$$

As seen from expressions (1) and (2) above, the moving distance ΔL is a correction amount for the pitch LPt of the scanning lines SL1 and SL2. When let td=Ld/Vh, the value td indicates the scan delay time on the photosensitive drum 12 which is caused by the difference between the angles of incidence θ1 and θ2. When expression (2) is rewritten with using the scan delay time td, following expression (3) is obtained:

$$\Delta L = td \times Vv \quad (3)$$

As in the case of the example shown in FIG. 9, when the beam spot BS1 precedes the beam spot BS2, the distance ΔL is a positive value so as to positively correct or reduce the pitch LPt. In contrast, when the beam spot BS2 precedes the beam spot BS1, the distance ΔL is a negative value so as to negatively correct or increase the pitch LPt.

As seen from the above, the distance LPs between the beam spots BS1 and BS2 on the photosensitive drum 12 in the subscanning direction is corrected by subtracting the distance ΔL from the theoretical pitch LPt of the scanning lines SL1 and SL2. As a result of this correction, the pitch of the scanning lines SL1 and SL2 which are actually formed on the photosensitive drum 12 properly coincides with the theoretical pitch LPt. Consequently, pixels constituting an image are correctly positioned and the image quality is prevented from being lowered, thereby obtaining an image of a high quality.

Even when the pitch of the scanning lines SL1 and SL2 fails to strictly coincide with the theoretical pitch LPt, moreover, the above-described correction prevents the image quality from being lowered so that an image of a sufficiently high quality is obtained. In an actual correction operation, the directions of the light beams BM1 and BM2 are adjusted by the adjusting devices 21a and 22a so that the scanning lines SL1 and SL2 drawn on the photosensitive drum 12 exhibit the smallest scanning line bends.

The two light beams BM1 and BM2 emitted from the two semiconductor laser units 21 and 22 draw the two scanning lines SL1 and SL2 in one scanning operation, whereby images of two lines are simultaneously formed. As compared with the case where only one light beam is used, therefore, the printing speed is doubled so that the printing speed is increased.

Figure 10:
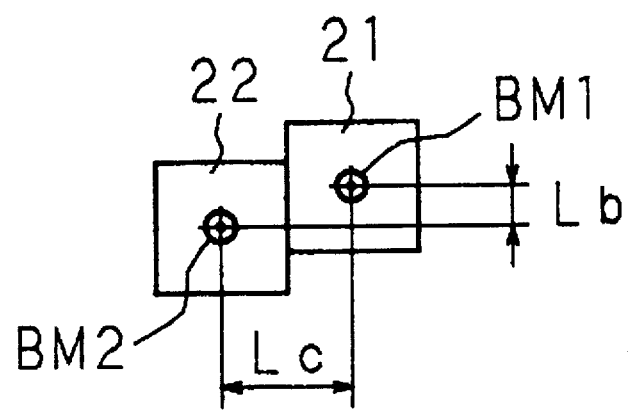
FIG. 10 is a diagram showing the positional relationship of semiconductor laser units.

When the angles of incidence θ1 and θ2 of the two light beams BM1 and BM2 are equal to each other, it is not required to conduct the above-described correction. In the view point of mounting the semiconductor laser units 21 and 22, however, it is impossible to make the angles of incidence θ1 and θ2 of the two light beams BM1 and BM2 equal to each other because of the following reason. As shown in FIG. 10, the two semiconductor laser units 21 and 22 have given form dimensions. When the emit distance Lb of the two light beams BM1 and BM2 in the vertical directions is set to have a predetermined value, therefore, the semiconductor laser units must be shifted in the lateral directions by a distance Lc.

Next, the scanning line bends which are produced by the polygon mirror 23 and the fθ-lens 24 in the light beams BM1 and BM2 emitted from the semiconductor laser units 21 and 22 will be described.

Figure 11A:
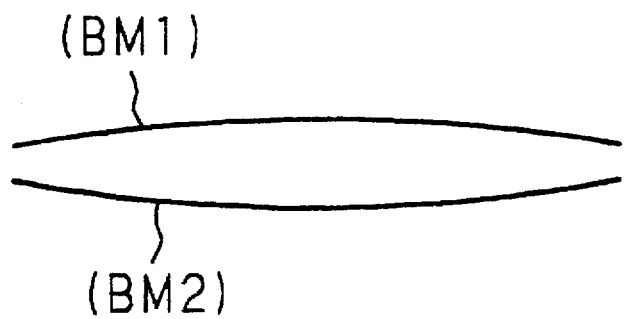
FIG. 11A is a diagram illustrating scanning line bends of light beams.
Figure 11B:
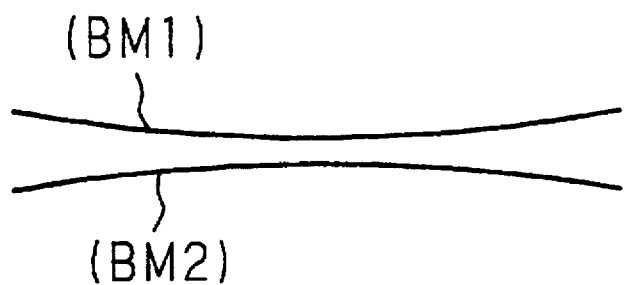
FIG. 11B is a diagram illustrating scanning line bends of light beams.
Figure 11C:
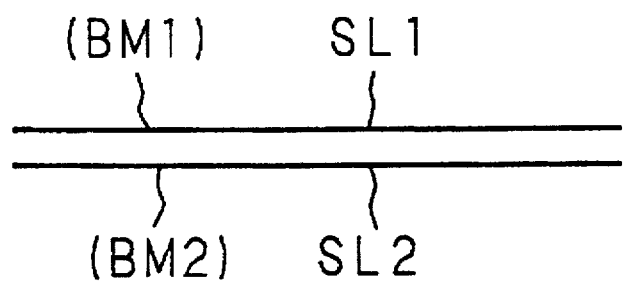
FIG. 11C is a diagram illustrating scanning line bends of light beams.
Figure 12:
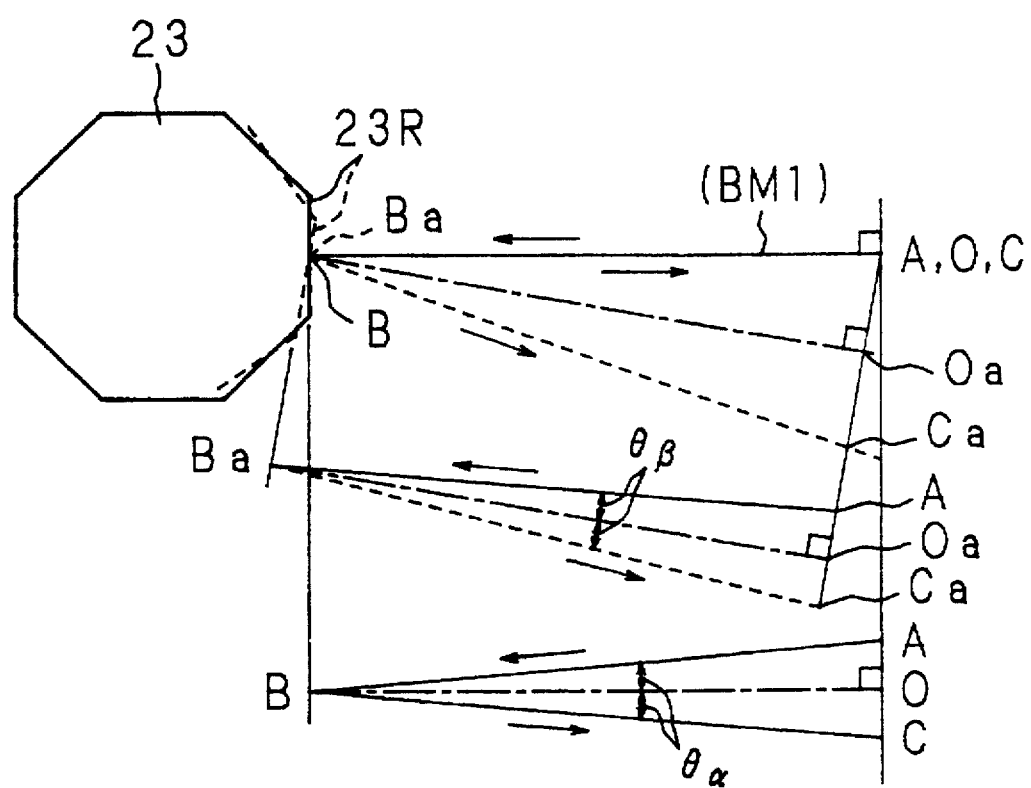
FIG. 12 is a diagram illustrating the difference between angles of incidence caused by the rotation angle position of a reflecting surface of a polygon mirror.

FIG. 6 is a development diagram showing a state in which the light beams BM1 and BM2 are projected onto a plane parallel to the rotation axis of the polygon mirror 23. FIGS. 11A, 11B, and 11C are diagrams illustrating scanning line bends of the light beams BM1 and BM2. FIG. 12 is a diagram illustrating the difference between angles of incidence on a plane parallel to the rotation axis which is caused by the rotation angle position of a reflecting surface 23R of the polygon mirror 23.

In FIG. 6, the two light beams BM1 and BM2 impinge on the reflecting surface 23R of the polygon mirror 23 obliquely and symmetrically in the vertical directions. The two light beams BM1 and BM2 are reflected from the reflecting surface 23R, and then cross a plane including the optical center of the fθlens 24 at a position PA which is between the polygon mirror 23 and the fθ-lens 24. Thereafter, the light beams BM1 and BM2 obliquely enter the fθ-lens 24 at a position other than the optical center, and then pass through the lens 24. During this process, scanning line bends are produced in the two light beams BM1 and BM2 by the polygon mirror 23 and the fθ-lens 24.

When the light beams BM1 and BM2 are reflected from the reflecting surface 23R, first scanning line bends are produced as shown in FIG. 11A. Specifically, the scanning locus of the light beam BM1 has an arcuate shape in which the center portion is higher than the incident position and the both end portions are lower than that. Conversely that of the light beam BM2 has an arcuate shape in which the center portion is lower than the incident position and the both end portions are higher than that.

It is considered that the first scanning line bends are caused from the following reason. In FIG. 12, loci of the light beam BM1 are indicated by three triangles, respectively. The uppermost triangle indicates the locus of the light beam BM1 projected onto a plane perpendicular to the rotation axis of the polygon mirror 23, and the second and third triangles indicate the locus of the light beam BM1 projected onto a plane parallel to the rotation axis of the polygon mirror 23 and perpendicular to the reflecting surface 23R. The point B is the center position of the reflecting surface 23R in the rotation direction, and the point Ba is a position which is shifted toward one end of the reflecting surface 23R as a result of the rotation of the polygon mirror 23. The lines OB and OaBa are the normals to the incidence point of the reflecting surface 23R.

In FIG. 12, the angles of incidence and reflection in the projection on the plane parallel to the rotation axis in the case where the light beam BM1 emitted from the point A impinges on the center portion (point B) of the reflecting surface 23R are indicated by θα. Those in the projection on the plane parallel to the rotation axis in the case where the light beam BM1 emitted from the point A impinges on the end portion (point Ba) of the reflecting surface 23R are indicated by θβ. Then the following expression (4) holds:

$$\theta\alpha < \theta\beta \quad (4)$$

In other words, the angle of incidence θβ in the case where the light beam impinges on the end portion (point Ba) of the reflecting surface 23R is greater than the angle of incidence θα in the case where the light beam impinges on the center portion (point B) of the reflecting surface 23R. The reason of the above is as follows: Since the height of the point A from the scanning plane (the plane including the normals to the reflecting surface 23R and perpendicular to the rotation axis) is constant, the lines AO and AOa are equal in length to each other. The lengths BO and BaOa of the normals which respectively elongate from the points B and Ba to the starting points of the incident light have the mutual relationship of BO>BaOa. Therefore, the expression (4) holds.

Consequently, the light beam BM1 (BM2) which impinges on an end portion of the reflecting surface 23R and is to impinge on an end of the photosensitive drum 12 passes through a position separated from the optical center of the fθ-lens 24. As a result, this appears as the scanning line bends such as shown in FIG. 11A.

When the light beams BM1 and BM2 pass through the fθ-lens 24, second scanning line bends such as shown in FIG. 11B are produced. Specifically, the scanning locus of the light beam BM1 has an arcuate shape in which the center portion is lower than the incident position and the both end portions are higher than that. Conversely that of the light beam BM2 has an arcuate shape in which the center portion is higher than the incident position and the both end portions are lower than that.

It is considered that the second scanning line bends are caused from the following reason. When the light beams BM1 and BM2 pass through the fθ-lens 24 with being separated from the optical center, the light beams are refracted. As moving from the center of the fθ-lens 24 in the scanning direction toward one end, the degree of refraction becomes greater. As refraction is greater or the light beams BM1 and BM2 pass through a position nearer either of the both ends, the light beams move closer to the optical center.

Namely, since the light beam BM1 passes through the portion below the optical center of the fθ-lens 24, the scanning locus of the light beam BM1 has the center portion lower than the incident position and the both end portions higher than the incident position. Since the light beam BM2 passes through the portion above the optical center of the fθ-lens 24, the scanning locus of the light beam BM2 has the center portion higher than the incident position and the both end portions lower than the incident position.

With respect to each of the light beams BM1 and BM2, therefore, the first and second scanning line bends are directed to directions opposite to each other, and hence the first and second scanning line bends cancel each other. As a result, the distance between the light beams BM1 and BM2 is stabilized so that the scanning lines SL1 and SL2 having a reduced scanning line bend are drawn on the photosensitive drum 12. Accordingly, the image quality reduction due to a scanning line bend is prevented from occurring and an image of a high quality is obtained.

Next, another embodiment for reducing the degree of a scanning line bend will be described.

Figure 13:
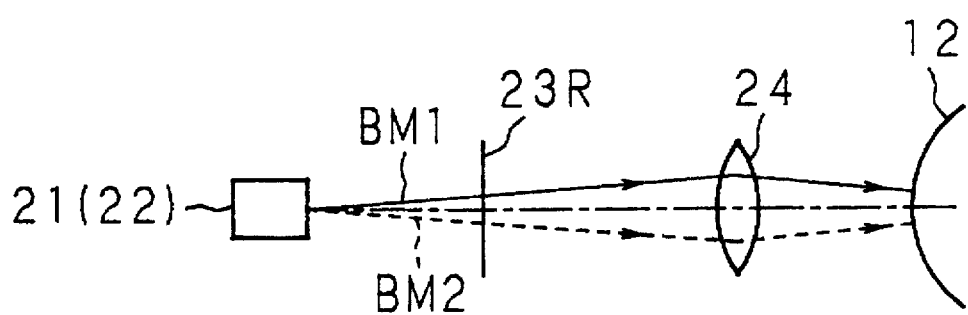
FIG. 13 is a development diagram showing a state in which light beams are projected onto a plane parallel to the rotation axis of a polygon mirror in another embodiment.

FIG. 13 is a development diagram showing a state in which the light beams BM1 and BM2 are projected onto a plane parallel to the rotation axis of the polygon mirror 23 in the other embodiment. As shown in FIG. 13, the emitting positions of the two light beams BM1 and BM2 emitted from the two semiconductor laser units 21 and 22 are at the same level in the direction along the rotation axis of the polygon mirror 23. The two light beams BM1 and BM2 are reflected from the reflecting surface 23R. Thereafter, the two light beams BM1 and BM2 obliquely enter the fθ-lens 24 at a position being out of the optical center, and then pass through the lens 24.

When the light beams BM1 and BM2 are reflected from the reflecting surface 23R, first scanning line bends such as shown in FIG. 11B are produced. When the light beams BM1 and BM2 pass through the fθ-lens 24, second scanning line bends such as shown in FIG. 11A are produced. With respect to the light beams BM1 and BM2, the first and second scanning line bends are directed to directions opposite to each other, and hence the first and second scanning line bends cancel each other. Accordingly, the scanning lines SL1 and SL2 having a reduced scanning line bend are drawn on the photosensitive drum 12.

In the above-described embodiments, the semiconductor laser units 21 and 22 are used as the light sources. Alternatively, gas laser devices may be used. As the scanning means, the polygon mirror 28 is used. Alternatively, other various devices including a galvanometer may be used. The fθ-lens 24 is used as the image forming lens. In place of the fθ-lens, or together with the fθ-lens, a lens of another kind such as a cylinder lens, a spherical lens, a lens for correcting an inverted figure or the other lens may be used. When an image forming lens consisting of plural lenses is used, a synthesized optical center may be used as the optical center of the image forming lens. The photosensitive drum 12 is used as the photosensitive body. In place of the photosensitive drum, a planar photosensitive body may be used. Furthermore, the configuration, shape, operation, and so on of the optical unit 11, the control unit 20, or the laser beam printer 1 may be modified partly or thoroughly in an adequate manner in accordance with the spirit of the invention. Further the invention can be applied to other image forming apparatus than laser printer.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An exposure method for scanning a photosensitive body with a plurality of light beams, comprising the steps of:

impinging a plurality of light beams at different angles on a scanning device having a revolving reflecting surface;

scanning the light beams with the scanning device in a main scanning direction in a state where a locus of at least one light beam during a single scan includes a first scanning line bend owing to reflection on said reflecting surface;

passing the scanned light beams through positions on an image forming lens to produce a second scanning line bend in the locus of the at least one light beam during a single scan, said second scanning line bend offsetting said first scanning line bend, said positions excluding an optical center of said image forming lens; and exposing a surface of the photosensitive body to the light beams which have passed through said image forming lens, said surface moving in a subscanning direction.

2. An exposure method according to claim 1, wherein said light beams are emitted from positions separated from each other in a direction of a rotation axis of said scanning means, and, after reflected on said reflecting surface, cross each other in a plane which includes the optical center of said image forming lens and which is perpendicular to said rotation axis.

3. An exposure method according to claim 1, wherein said light beams are emitted from the same position in a direction of a rotation axis of said scanning means, and at different angles with respect to said rotation axis.

4. An image forming apparatus for scanning a photosensitive body with a plurality of light beams so as to form an image, comprising:

scanning means for scanning light beams in a main scanning direction in a state where a locus of at least one light beam during a single scan includes a first scanning line bend, said scanning means having a revolving reflecting surface;

a plurality of light sources for emitting said light beams to said reflecting surface at different angles of incidence;

an image forming lens through which said light beams scanned by said scanning means pass at positions other than an optical center, producing a second scanning line bend in the locus of said at least one light beam during a single scan, said second scanning line bend offsetting said first scanning line bend; and a photosensitive body which has a surface moving in a subscanning direction and on which an image is formed by the light beams which have passed through said image forming lens.

5. An image forming apparatus according to claim 4, wherein said light sources are arranged so that the light beams are emitted from positions separated from each other in a direction of a rotation axis of said scanning means, and after reflected from said reflecting surface, cross each other in a plane which includes the optical center of said image forming lens and which is perpendicular to said rotation axis.

6. An image forming apparatus according to claim 4, wherein said light sources are arranged so that the light beams are emitted from the same position in a direction of a rotation axis of said scanning means, and at different angles with respect to said rotation axis.

7. An image forming apparatus according to claim 4, wherein angles of incidence at which the light beams impinge on said scanning means are different from each other in a plane perpendicular to a rotation axis of said scanning means.

8. An image forming apparatus according to claim 7, further comprising a correcting means for correcting angles of optical axis of the light beams so that a distance between the scanning lines on said photosensitive body is corrected in accordance of the amount of a deviation in the subscanning direction due to a difference in the angles of incidence.

9. An image forming apparatus according to claim 8, wherein said correcting means conducts correction so that a correction amount ΔL for the distance between said scanning lines satisfies the following expression:

$$\Delta L = td \times Vv$$

where td indicates a scan delay time on said photosensitive body which is caused by the difference between said angles of incidence, and Vv indicates a moving speed of the surface of said photosensitive body in a subscanning direction.

10. An image forming apparatus in which a photosensitive body is scanned by a plurality of light beams, thereby forming an image, comprising:

scanning means for scanning light beams in a main scanning direction, said scanning means having a reflecting surface which is moved by rotation;

a plurality of light sources for emitting said light beams to said scanning means at different angles of incidence projected onto a plane perpendicular to a rotation axis of said scanning means;

correcting means for correcting angles of optical axis of the light beams so that a distance between the scanning lines due to the light beams on said photosensitive body is corrected in accordance with the amount of a deviation in the subscanning direction due to the difference of said angles of incidence; and a photosensitive body which has a surface moving in a subscanning direction and on which an image is formed by the light beams scanned by said scanning means.

11. An image forming apparatus according to claim 10, wherein said correcting means conducts correction so that a correction amount αL for the distance between said scanning lines satisfies the following expression:

$$\Delta L = td \times Vv$$

where td indicates a scan delay time on said photosensitive body which is caused by the difference between said angles of incidence, and Vv indicates a moving speed of the surface of said photosensitive body in a subscanning direction.

* * * * *